(12) United States Patent
Wilkes et al.

(10) Patent No.: US 6,851,024 B1
(45) Date of Patent: Feb. 1, 2005

(54) EXCLUSIVE CACHING IN COMPUTER SYSTEMS

(75) Inventors: John Wilkes, Palo Alto, CA (US); Theodore M. Wong, Pittsburgh, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 241 days.

(21) Appl. No.: 09/641,383

(22) Filed: Aug. 17, 2000

(51) Int. Cl.[7] .............................................. G06F 12/08
(52) U.S. Cl. ........................ 711/133; 711/141; 711/122
(58) Field of Search ................................. 711/133, 134, 711/136, 144, 141, 122, 135, 113, 143, 145

(56) References Cited

U.S. PATENT DOCUMENTS

| | | | | |
|---|---|---|---|---|
| 4,603,380 A | * | 7/1986 | Easton et al. ................ | 711/113 |
| 5,283,884 A | * | 2/1994 | Menon et al. ................. | 75/724 |
| 5,353,428 A | * | 10/1994 | Shibata ........................ | 711/145 |
| 5,542,066 A | * | 7/1996 | Mattson et al. .............. | 711/136 |
| 5,600,817 A | * | 2/1997 | Macon et al. ................ | 711/113 |
| 5,606,688 A | * | 2/1997 | McNutt et al. .............. | 711/113 |
| 5,933,853 A | * | 8/1999 | Takagi ......................... | 711/113 |
| 6,243,795 B1 | * | 6/2001 | Yang et al. .................. | 711/159 |
| 6,253,290 B1 | * | 6/2001 | Nakamoto ................... | 709/213 |
| 6,324,632 B1 | * | 11/2001 | McIntosh-Smith ........... | 711/173 |

OTHER PUBLICATIONS

Ron White, How Computers Work, Copyright 1997, Macmillan Computer Publishing USA, p. 105.*

* cited by examiner

Primary Examiner—Mano Padmanabhan
Assistant Examiner—Midys Inoa

(57) ABSTRACT

A computer system with mechanisms for exclusive caching that avoids the accumulation of duplicate copies of information in host and storage system caches. A computer system according to these exclusive caching techniques includes a host system having a host cache and a storage system having a storage system cache and functionality for performing demote operations to coordinate the placement of information in the host cache to the storage system caches.

19 Claims, 3 Drawing Sheets

EXCLUSIVE CACHING IN COMPUTER SYSTEMS

FIELD OF INVENTION

The present invention pertains to the field of computer systems. More particularly, this invention relates to exclusive caching in a computer system.

ART BACKGROUND

A typical computer system includes one or more host systems and one or more storage systems. A storage system usually provides relatively large-scale non-volatile storage of information which may be accessed by a host system. A host system typically accesses a storage system by performing write and read operations to and from the storage system via a communication path between the host and storage systems.

A typical host system includes a host processor and a host cache. A typical host cache temporarily holds information obtained from a storage system and provides the host processor with relatively fast access to information held in the host cache. A storage system commonly includes a storage medium and a storage system cache. A typical storage system cache temporarily holds information obtained from the storage medium and provides a host system with relatively fast access to the information contained in the storage system cache.

In prior host systems, the host cache is usually managed in a manner designed to increase the likelihood that the information accessed by the host processor will be contained in the host cache. Similarly, the storage system cache in prior storage systems is usually managed to increase the likelihood that the information accessed by a host system will be contained in the storage system cache. As a consequence, the same information, i.e. the information likely to be accessed by a host processor, often accumulates in both the host cache and the storage system caches. Unfortunately, such duplication of information reduces the effective storage space of the host and storage system caches. Such duplication is wasteful because of the relatively high cost of implementing caches in the host system and the storage systems.

SUMMARY OF THE INVENTION

A computer system is disclosed with mechanisms for exclusive caching that avoid the accumulation of duplicate copies of information in host and storage system caches. A computer system according to these exclusive caching techniques includes a host system having a host cache and a storage system having a storage system cache and functionality for performing demote operations to coordinate the placement of information in the host cache to the storage system caches.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
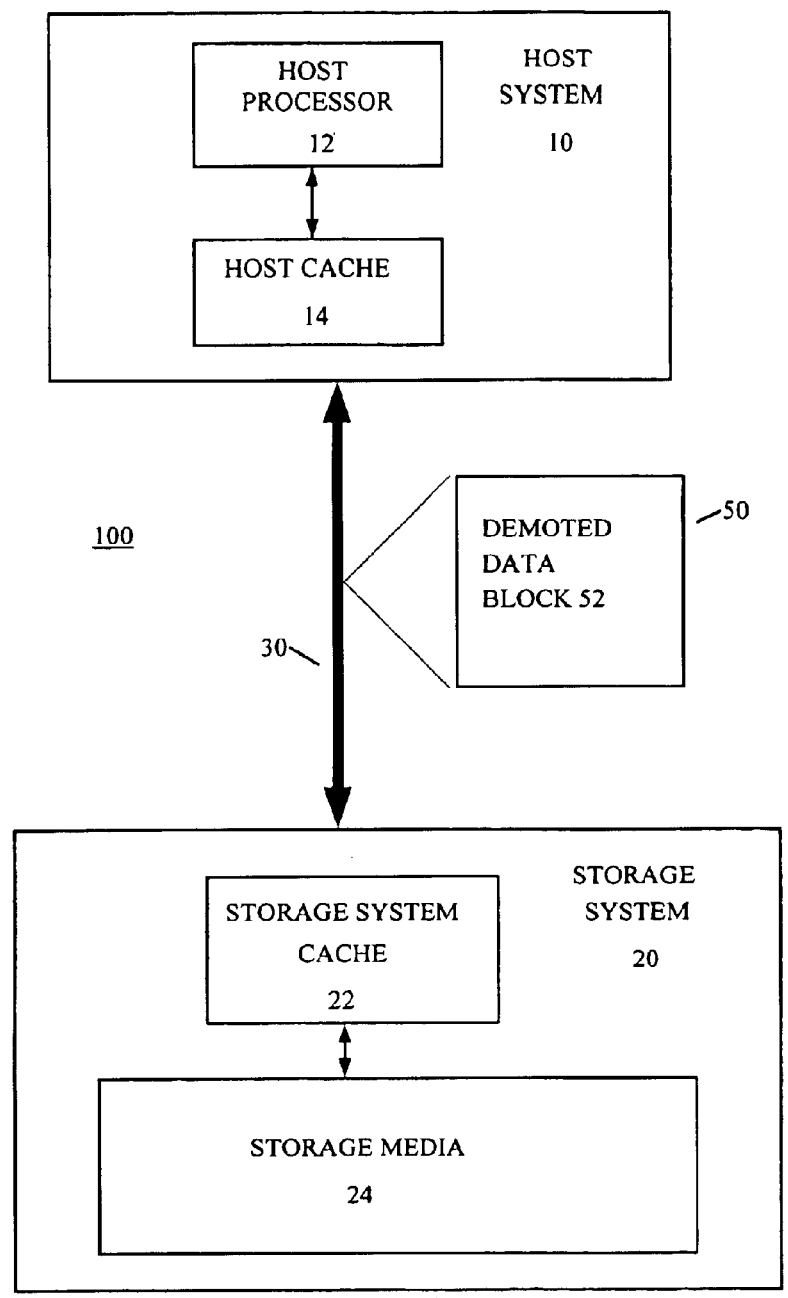
FIG. 1 shows a computer system that incorporates the exclusive caching techniques which are disclosed herein.

FIG. 1 shows a computer system 100 that incorporates the exclusive caching techniques which are disclosed herein. The computer system 100 includes a host system 10 and a storage system 20 that communicate via a communication path 30. The host system 10 includes a host processor 12 and a host cache 14. The storage system 20 includes a storage system cache 22 and a storage media 24.

The host system 10 obtains information from the storage system 20 by performing read operations via the communication path 30. The host system 10 transfers information to the storage system 20 by performing write operations via the communication path 30. In addition, the host system 10 demotes information from the host cache 14 to the storage system cache 22 by performing demote operations via the communication path 30. An example demote operation 50 is shown which carries a demoted data block 52 to the storage system 20 via the communication path 30.

In one embodiment, the host cache 14 and the storage system cache 22 are organized into sets of information. These sets of information are hereinafter referred to as data blocks but may also be referred to as cache blocks, cache lines, or data lines. A data block hereinafter refers to a block of data having a particular address whether the data block is stored in a cache or storage media.

The host processor 12 accesses data by performing a read or a write to the host cache 14. If the data referenced in the read or the write from the host processor 12 is not held in the host cache 14, then the host system 10 performs a read operation via the communication link 30 to obtain a data block that contains the data needed by the host processor 12 from the storage system 20.

In response to the read operation by the host system 10, the storage system 20 obtains the data block specified in the read operation from storage media 24 and transfers it to the host system 10 via the communication link 30. In embodiments of the storage system 20 that perform read-ahead operations from the storage media 24, the data block specified in the read operation may be in the storage system cache 22. If so, the storage system 20 obtains the data block from storage system cache 22 and transfers it to the host system 10 via the communication link 30 and then evicts the data block from the storage system cache 22.

The host system 10 receives the data block from the storage system 20 via the communication link 30 and stores the data block into the host cache 14. The host system 10 then completes the read or write operation for the host processor 12.

The process of storing a new data block into the host cache 14 may cause an eviction of another data block from the host cache 14. If the evicted data block is clean, then rather than being discarded as in prior systems it is instead demoted to the storage system cache 22. An evicted data block is demoted by transferring it to the storage system 20 via the communication link 30 using a demote operation. For example, the demote operation 50 carries the demoted data block 52 which was a clean data block evicted from the host cache 14.

The storage system 20 handles the demote operation 50 by storing the demoted data block 52 into the storage system cache 22 while performing an eviction from the storage system cache 22 if needed. The initial placement of a data block into the host cache 14 and the eventual eviction and demotion of that data block to the storage system cache 22 avoids the creation of duplicate copies of the data block in the host cache 14 and the storage system cache 22.

The host system 10 includes a cache controller for managing the host cache 14. The cache controller in the host system 10 may implement any one or more of a set of known replacement policies for selecting data blocks to be evicted from the host cache 14. For example, the host system 10 may implement a least recently used (LRU) replacement policy for the host cache 14. Alternatively, the host system 10 may implement a most recently used (MRU) replacement policy for the host cache 14. In yet another alternative, the host system 10 may implement a most frequently replaced (MFR) replacement policy. These are only examples of suitable replacement policies, and others may be employed.

The storage system 20 may be any type of storage system which is capable of holding data blocks for access by the host system 10 and which includes a storage system cache. In one embodiment, the storage media 24 is a disk drive. In another embodiment, the storage media 24 is an array of disk drives. In yet another embodiment, the storage media 24 is a solid-state memory. In another embodiment, the storage media 24 is a tape. The storage system 20 may implement the functionality of a server wherein the host system 10, as well as other hosts systems on th communication path 30, may access the storage-system 10 using any one or more of a wide variety of known client-server communication protocols.

In an embodiment in which the storage media 24 is a tape, the host cache 14 may be a RAM cache or a disk cache.

The storage system cache 22 may be employed to hold data blocks which are obtained by read-ahead operations on the storage media 24 as well as to hold the data blocks which are demoted from the host system 10. In one embodiment, data blocks which are demoted from the host system 10 may be stored in any free area in the storage system cache 22. Alternatively, the storage of demoted data blocks may be limited to predetermined portions or sub-areas of the storage system cache 22. The storage system cache 22 may also be employed to hold other data blocks from read operations performed by the host system 10. The storage system cache 22 may be employed to hold other data blocks from write operations performed by the host system 10.

The storage system 20 includes a cache controller that may implement any known data block replacement policy for the storage system cache 22.

In addition, the cache controller in the storage system 20 may preferentially keep data blocks in the storage system cache 22 that are being shared by multiple host systems that have access to the storage system 20. For example, the cache controller may select data blocks for eviction from among the unshared data blocks only and select shared data blocks for eviction only if no unshared data blocks remain in the storage system cache 22.

Alternatively, the cache controller may take into account the shared status of a data block as only one factor in its replacement policy with other factors being the age, time of last update, etc. for the data block. These factors may be weighted in any combination.

The communication path 30 may be implemented as any type of communication path that is cable of carrying information between the host system 10 and the storage system 20. For example, the communication path 30 may be a system bus or a peripheral bus in a computer system. In another example, the communication path 30 may be a network communication path. The communication path 30 may include a combination of bus and network elements. The host system 10 and the storage system 20 include the appropriate communication hardware and software elements for performing communication via the particular embodiment of the communication path 30.

Figure 2:
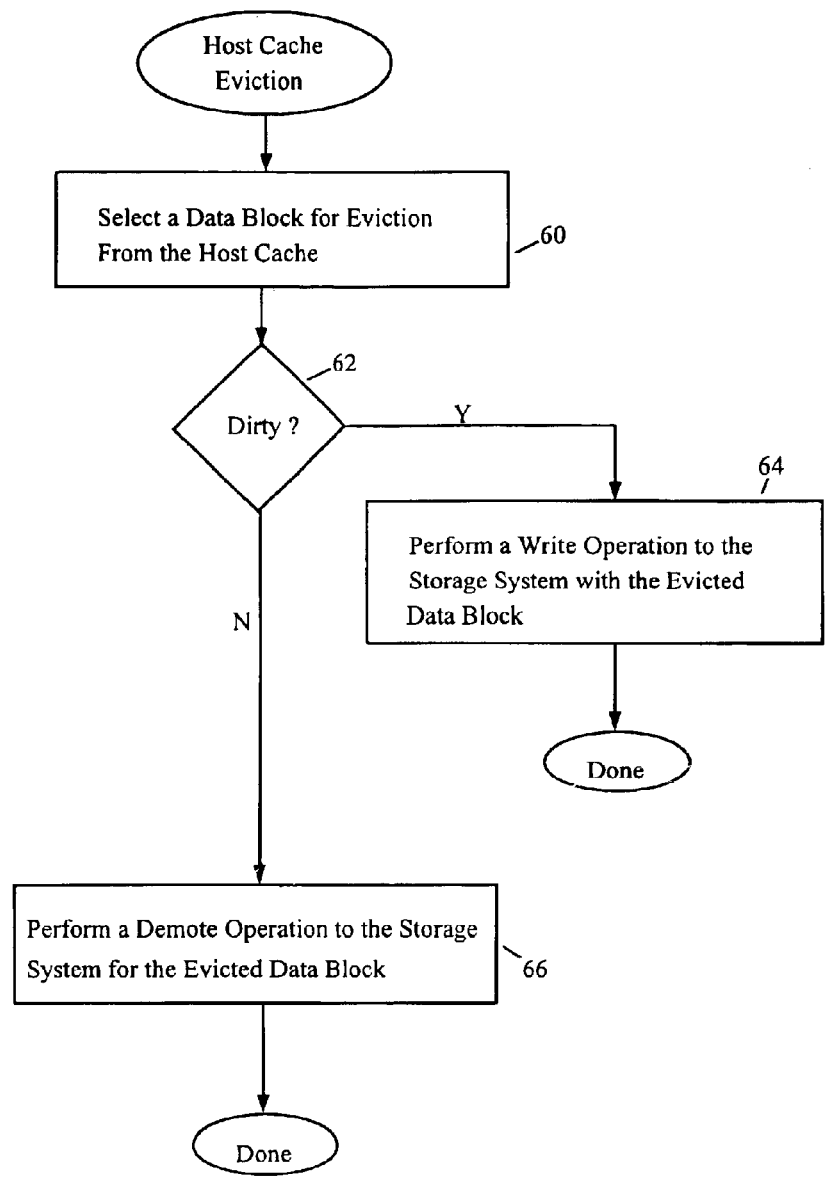
FIG. 2 illustrates an eviction and demotion of a data block from a host cache according to the present techniques.

FIG. 2 illustrates an eviction and demotion of a data block from the host cache 14 according to the present techniques. At step 60, the cache controller in the host system 10 selects a data block in the host cache 14 for eviction. Any type of replacement policy may be employed at step 60 to select the data block for eviction.

At step 62, the cache controller in the host system 10 determines whether the data block selected at steps 60 is dirty. A dirty data block-refers to a data block whose contents have changed since being entered into the host cache 14. If the data block selected at step 60 is dirty, then at step 64 the host system 10 performs a write operation to the storage system 20 to write back the evicted data block to the storage system 20.

If the data block selected at step 60 is not dirty, then at step 66 the host system 10 performs a demote operation for the evicted data block. The demote operation carries the evicted data block from the host cache 14 to the storage system 20 as a demoted data block. For example, the demote operation 50 carries the demoted data block 52.

Figure 3:
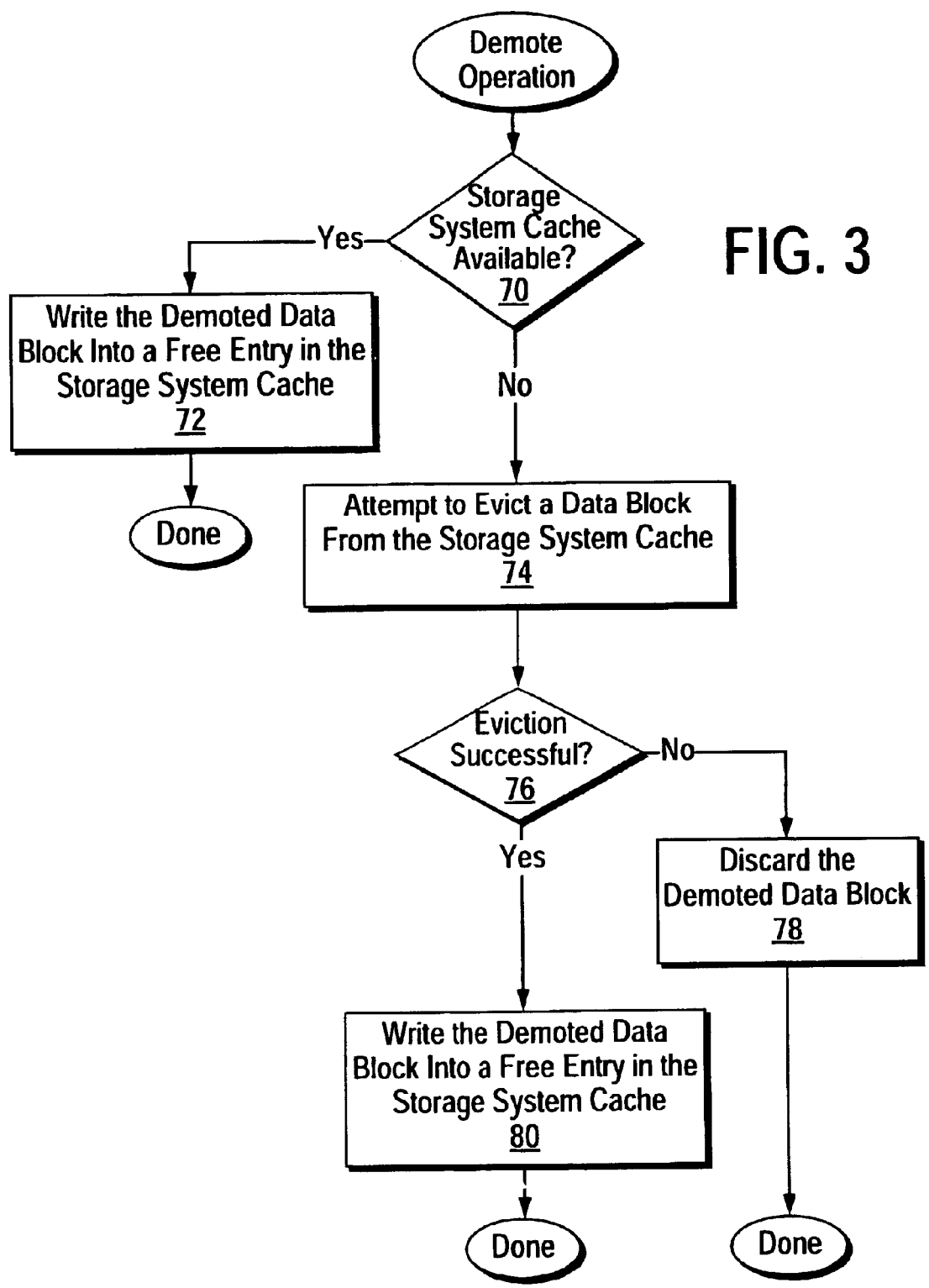
FIG. 3 illustrates the handling of a demote operation by a storage system.

FIG. 3 illustrates the handling of the demote operation 50 by the storage system 20. At step 70, the cache controller in the storage system 20 determines whether space is available in the storage system cache 22 to hold the demoted data block 52. If space is available in the storage system cache 22, then the demoted data block 52 is written into a free entry in the storage system cache 22 at step 72.

A free entry in the storage system cache 22 may not be available at step 70 if, for example, the storage system cache 22 has been filled by read-ahead operations from the storage media 24. In another example, a portion of the storage system cache 22 which is allocated to holding demoted data blocks may be filled with previously demoted data blocks.

If space is not available in the storage system cache 22 for the demoted data block 52 at step 70, then at step 74 an attempt is made to evict a data block from the storage system cache 22. If a data block was successfully evicted from the storage system cache 22 then at step the 80 the demoted data block 52 is written into the newly freed entry in the storage system cache 22. Otherwise, the demoted data block is discarded at step 78.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for exclusive caching between a storage system cache of a storage system and a host cache of a host system, comprising the steps of:

providing the host system with access to the information by reading the information from the storage system cache and then storing the information in the host cache and evicting the information from the storage system cache such that the information does not occupy space in both the host and storage system caches;

demoting the information from the host cache to the storage system cache if the information is clean when evicted from the host cache such that the information does not occupy space in both the host and storage system caches.

2. The method of claim 1, wherein the step of demoting comprises the step of transferring the information to the storage system cache in a demoted data block.

3. The method of claim 1, wherein the step of demoting comprises the step of storing the information in any free area of the storage system cache.

4. The method of claim 1, wherein the step of demoting cache comprises the step of storing the information in a predetermined sub-area of the storage system cache.

5. The method of claim 1, wherein the step of demoting includes the step of evicting a data block from the storage system cache.

6. The method of claim 5, wherein the step of evicting includes the step of selecting the data block for eviction from the storage system cache from among a set of unshared data blocks in the storage system cache.

7. The method of claim 5, wherein the step of evicting includes the step of selecting the data block for eviction from the storage system cache using a shared status of the data block as a factor in a replacement policy.

8. A computer system, comprising:

storage system having a storage media and a storage system cache;

host system having a host cache;

means for exclusively caching a set of information obtained from the storage media such that the information is stored either in the host cache or the storage system cache but not both caches at the same time wherein the means for exclusively caching includes means for reading the information from the storage system cache and then storing the information in the host cache and evicting the information from the storage system cache and means for demoting the information from the host cache to the storage system cache if the information is clean when evicted from the host cache.

9. The computer system of claim 8, wherein the means for demoting comprises means for transferring the information to the storage system cache in a demoted data block via a communication path between the host system and the storage system.

10. The computer system of claim 8, wherein the means for demoting comprises means for storing the information in any free area of the storage system cache.

11. The computer system of claim 8, wherein the means for demoting comprises means for storing the information in a predetermined sub-area of the storage system cache.

12. The computer system of claim 8, wherein the means for demoting includes means for evicting a data block from the storage system cache.

13. The computer system of claim 12, wherein the means for evicting includes means for selecting the data block for eviction from the storage system cache from among a set of unshared data blocks in the storage system cache.

14. The computer system of claim 12, wherein the means for evicting means for selecting a data block for eviction from the storage system cache using a shared status of the data block as a factor in a replacement policy.

15. The computer system of claim 8, wherein the storage system cache includes a sub-area for exclusive caching and a sub-area holding other cached information.

16. The computer system of claim 15, wherein the other cached information is obtained by performing read-ahead operations from the storage media.

17. The computer system of claim 8, further comprising means for transferring the information evicted from the host cache to the storage system in a write operation if the information is dirty.

18. The computer system of claim 8, wherein the host cache is a RAM cache.

19. The computer system of claim 8, wherein the host cache is a disk cache.

* * * * *